May 26, 1964 C. O. GLASGOW 3,134,572
VALVE SEAT
Filed May 17, 1961

INVENTOR.
CLARENCE O. GLASGOW
BY
Dunlap, Laney & Hubbard
ATTORNEYS

United States Patent Office 3,134,572
Patented May 26, 1964

3,134,572
VALVE SEAT
Clarence O. Glasgow, 2620 S. Yorktown, Tulsa, Okla.
Filed May 17, 1961, Ser. No. 110,770
2 Claims. (Cl. 251—363)

The present invention relates to valve seats and more particularly, but not by way of limitation, relates to a seat for a check-type valve having a spherical ball held against a seat by the pressure being retained.

As is known in the art, it is extremely difficult to construct a valve which will provide an absolute or bubble-tight seal at all pressures ranging from a vacuum to 20,000 p.s.i., for example. Valves presently used for pressures in this range will not maintain an absolute seal, but will invariably leak a few drops over a period of a few hours. In many hydraulic systems using 10,000 p.s.i. or more, each drop of hydraulic fluid leaked may cause a drop of several hundred p.s.i. in the hydraulic system. The valves presently being used require considerable close machining, special assembly methods, and expensive handlapping to finally mate a particular ball to a particular seat. The resulting valve is very expensive and still usually will not maintain an absolute seal at very high pressures, or a bubbletight seal at low pressures.

When a ball valve is used to stop fluid flow in a high pressure hydraulic system, extremely high fluid velocities are created adjacent the seat just as the ball valve closes or opens. The high fluid velocities are caused by the very small cross-sectional area of the orifice formed between the ball valve and the valve seat just before the ball valve seats and stops the flow. This high flow velocity causes very rapid abrasion upon all but the most expensive abrasion-resistant metals, even when no abrasion particles are entrained in the liquid. As soon as the slightest irregularity exists on either the seat or the ball, the high velocity liquid stream resulting therefrom will quickly erode the metal and the valve seat will be ruined. Therefore, every time the valve body contacts the valve seat, an absolutely perfect seal must be made or a high velocity liquid stream will be formed. Check valves used in combination with reciprocating liquid pumps must open and close many times a minute, and therefore have many opportunities to seat improperly and cause a high velocity fluid wash which will ruin the valve seat.

Resilient materials, such as synthetic rubber, have high resistances to abrasion as a result of the high flow velocities, but when used to seal pressures over 10,000 p.s.i., the rubbers are extruded through any finite opening or leak between the valve body and the seat. In other words, at these high pressures, the resilient synthetic rubber becomes just another liquid and cannot be used as a seal unless retained by a metal seal or the like in substantially the same manner as the hydraulic liquid itself.

Ball valve seats have heretofore been manufactured having two spaced annular seats adapted to simultaneously seat a ball valve and having a resilient O-ring retained in an annular dovetailed groove between the two annular seats. However, these valve seats are expensive to manufacture because the seats must be fabricated from two separately machined parts to form the dovetailed groove recess necessary to retain the O-ring. The two separate parts must then be joined by heat shrinking or otherwise connecting one part to the other. The two seats must then be handlapped in the conventional manner to mate with a particular valve. In spite of the expensive manufacturing process, this type valve will not form an absolute seal at high pressures or a bubbletight seal at low pressures.

It is contemplated by the present invention to provide a valve seat constructed of a sleeve having an annular metallic seat or the like with a resilient annular low-pressure seat adjacent the metallic seat. The resilient material forming the seat is bonded to the sleeve and is adapted to seat and be compressed by the valve member before the valve member is seated on the metallic seat. The resilient material seat, which has a much greater resistance to abrasion than the metal, provides a bubble-tight, low-pressure seal and also stops the flow of fluid and protects the metallic high-pressure seat from abrasion. When the resilient material has been displaced and/or compressed to some extent and the valve member is seated on the high-pressure seat, the high-pressure seat prevents the high pressure from extruding the resilient material through the seat. It is also contemplated by the present invention to provide an economical method of constructing a valve seat wherein the resilient material is molded in and bonded to a sleeve and the metallic seat is mated to the ball valve member by high pressure which deforms the seat to provide an economical method of manufacture and eliminate handlapping.

Therefore, an important object of the present invention is to provide an improved valve seat which will absolutely seal all pressures ranging from atmospheric to many thousands of pounds per square inch.

Another object of the present invention is to provide a valve seat of the type described which can be manufactured at a very low cost.

Another object of the present invention is to provide a valve seat of the type described having a high resistance to abrasive erosion caused by high fluid velocities so that the valve seat will have a long service life.

Another object of the present invention is to provide a valve seat of the type described which retains a resilient, low-pressure seating material between two high-pressure seats to prevent extrusion of the resilient material at high pressures.

Another object of the present invention is to provide a valve seat of the type described which does not require handlapping in order to mate a particular valve member to a valve seat.

Still another object of the present invention is to provide an economical method for constructing a valve seat of the type described.

Additional objects and advantages will be evident from the following detailed description and drawings wherein.

Figure 1:
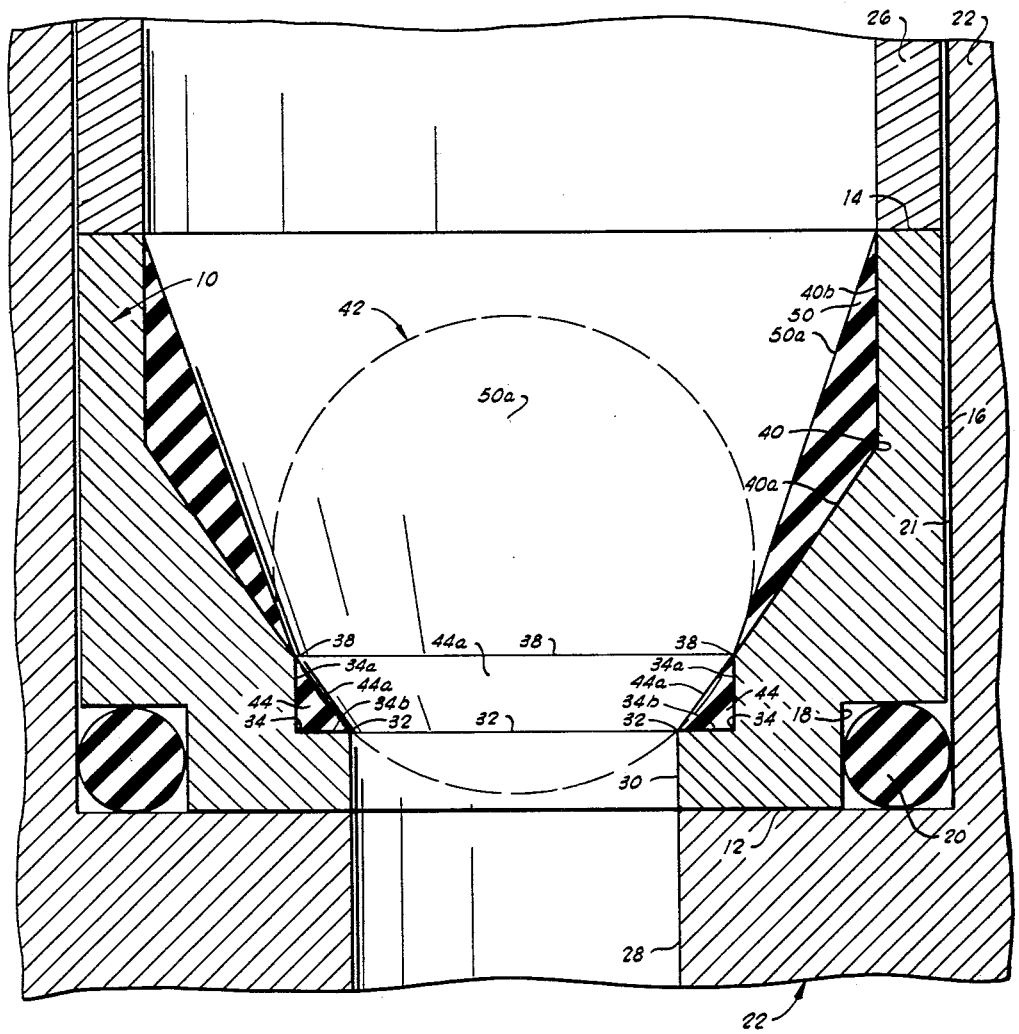
FIGURE 1 is a cross-sectional view taken along the longitudinal axis of a valve seat constructed in accordance with the present invention, with a spherical valve member shown in dotted outline.

Referring now to the drawings, a sleeve indicated generally by the reference numeral 10 is fabricated from a very hard material, such as stainless steel. The sleeve 10 may be said to have a first, low-pressure end 12 and a second, high-pressure end 14. The sleeve 10 preferably has a cylindrically shaped outer surface 16 and may be provided with an annular recess 18 adjacent the first end 12 for receiving an annular O-ring 20, shown in cross section. The sleeve 10 may then be inserted in a cylindrical well 21 of a valve housing 22 with the first end 12 abutting a shoulder 24 of the housing 22. The second end 14 of the sleeve 10 may be retained by a suitable member 26 threadedly retained in the housing 22 by means not shown. The O-ring 20 prevents fluid from passing between the housing 22 and the sleeve 10. The housing 22 also has a fluid orifice 28 which is in register with a fluid orifice 30 in the sleeve 10 which communicates between the first and second ends of the sleeve to provide a fluid passage through the valve.

Figure 2:
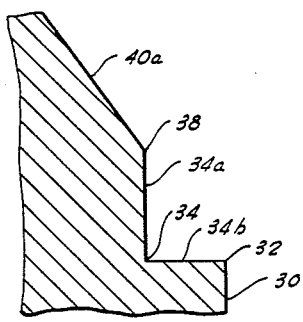
FIGURE 2 is an enlarged view of a part of the valve seat of FIG. 1 showing details of construction.

Referring now to FIG. 2, a first metallic annular seating surface 32 is formed between a counterbore 34 which extends from the second end 14 toward the first end 12 of the sleeve 10 and has a cylindrical wall surface 34a and a planar bottom surface 34b. The annular seating surface 32 has a very small area due to the relatively sharp intersection of the cylindrical surface forming the orifice 30 and the planar bottom 34b of the counterbore 34 which intersects the cylindrical surface at right angles. It is to be understood that the bottom 34b of the counterbore 34 need not be planar but can be of any form which will intersect the orifice to form an annular seating surface of relatively small area.

A second annular seating surface 38 is formed around the inner periphery of the sleeve 10 at the intersection of the cylindrical wall surface 34a of the counterbore 34 and the conical wall surface 40a of a second counterbore 40. The counterbore 40 also has a cylindrical wall surface 40b extending from the second end 14 toward the first end 12 of the sleeve 10. The second seating surface 38 also has a very small area as a result of the intersection of the conical surface 40a and the cylindrical surface 34a.

The spacing between and the diameters of the seating surfaces 32 and 38 are chosen such that a spherical ball valve 42 will simultaneously engage and be seated on the two surfaces. The areas of the seating surfaces 32 and 38, when first constructed, should be sufficiently small that the seating surfaces will be conformed to a ball seated thereon when subjected to a high pressure, and are herein termed "self-conforming seats" as hereinafter described in detail.

A first body of resilient material 44 preferably fills the first counterbore 34 and is bonded to the wall surface 34a and bottom surface 34b thereof. The resilient material 44 forms an annular seating surface 44a which is adapted to contact the spherical surface of the ball valve 42 (shown in dotted outline) before the ball valve 42 contacts either of the annular seating surfaces 32 or 38. The annular resilient seating surface 44a is preferably conically shaped and is tapered from the annular seating surface 32 to the annular seating surface 38. It follows then, by simple geometry, that the spherical ball valve 42 must contact the conical surface 44a before it can contact either of the seating surfaces 32 or 38.

A second body of resilient material 50 fills the second counterbore 40 and is bonded to the wall surfaces 40a and 40b of the counterbore 40. The material also preferably tapers uniformly from the second annular seating surface 38 to the end 14 of the sleeve 10 to form a uniform conical surface 50a.

When constructing the valve seat, the sleeve 10 can easily be machined from a cylindrical stainless steel rod having an outer diameter equivalent to the diameter of the outer surface 16. Such a steel rod can readily be purchased from the foundry, since the tolerance of the outer diameter of the sleeve 10 is not too critical. There are many economical ways in which the fluid orifice 30, the first counterbore 34, and the second counterbore 40 can be drilled in the sleeve 10. For example, the counterbore 34 may be drilled completely through the desired length of the sleeve 10 before the sleeve is cut from the rod stock. The orifice bore 30 can then serve as a guide bore for drilling the first counterbore 34. The depth to which the counterbore 34 is drilled is not critical. The second counterbore 40 can then readily be drilled using the first counterbore 34 as a guide bore. Or, it will be obvious that the fluid orifice 30 and both the counterbores 34 and 40 can be drilled simultaneously with a single tool having the proper outline shape. In this case, it would be a very simple matter to control the tolerances required.

Sleeves having tolerances of ±0.002 inch in the diameter of the fluid orifice 30, ±0.002 inch in the diameter of the first counterbore 34, ±0.002 inch in alignment of the orifice 30 and counterbore 34, and having a tolerance of ±0.004 inch in the spacing along the axis between the first seating surface 32 and the second seating surface 38, have operated with excellent results. It will be appreciated that tolerances of this magnitude can readily be acquired by most machining operations with no special effort. Further, it will be obvious that the machining operation is readily susceptible to almost complete and simple automation.

After the sleeve 10 has been machined, the resilient material bodies 44 and 50 are then molded in the recesses formed by the counterbores 34 and 40. The resilient material is preferably chosen from one of the new synthetic rubbers which has a very high resistance to abrasion, this abrasive resistance being many times greater than that of the more expensive hardened steels, such as stainless steel. The molding operation may be any conventional method. One method which has proven very satisfactory involves placing the sleeve 10 in a well formed in the lower jaw of a press. The well is specially sized to receive the sleeve 10 in close-fitting engagement, and means are provided for heating the well. The other jaw of the press is provided with a male insert or core. The exterior of the core conforms substantially to the interior surface of the final valve seat and has a portion which is received in close-fitting, sealing engagement within the fluid orifice 30 and also has conically tapered surfaces adapted to form the conical surfaces 44a and 50a. The mating core does not have to touch exactly the seating surfaces 32 and 38, and will permit extrusive flow of the synthetic rubber between the counterbores 34 and 40 under high pressure. The male core also has a flange portion which abuts the second end 14 of the sleeve 10 and forms a tight seal therewith so that all uncured rubber material retained in the sleeve between the sleeve and the male core can be subjected to a high pressure.

A measured quantity of uncured synthetic rubber is placed in the sleeve 10. The male core is then inserted in the sleeve 10 with a force sufficiently great to compress the rubber material and extrude the excess rubber from the top of the sleeve just prior to the core flange seating on the second end 14. Heat is then applied to the sleeve which causes the synthetic rubber to expand and exert a great internal pressure. The combination of pressure and heat causes the synthetic rubber to congeal into a solid mass and to enter the pores of the stainless steel sleeve 10 and become integrally bonded therewith.

After the synthetic rubber has been cured and cooled, the valve seat is inserted in any suitable housing so that it may be subjected to a very high pressure. A spherical valve body, which may be the ball valve 42, is then inserted within the sleeve 10 and comes to rest on the conical resilient seating surface 44a. Stainless steel balls heat-treated and hardened to withstand crushing pressures in excess of 250,000 p.s.i. and precision ground to a spherical tolerance of 0.000,025 inch can be purchased for only a few cents. These balls are excellent for the present application.

After the resilient material is molded in the sleeve 10, a very thin film of synthetic rubber exists over each of the annular seating surfaces 32 and 38. When the spherical ball is first placed on the resilient seating surface 44a, a tight low-pressure seal is formed. As the pressure on the ball 42 is increased, the body of resilient material is slowly deformed, as shown by the dotted line representing the ball 48, until the spherical ball 48 simultaneously approaches the seating surfaces 32 and 38. When the pressure is increased, the force of the ball valve 42 quickly cuts through the film of rubber covering the seating surfaces 32 and 38 and any excess volume of rubber will be extruded and cut off until the ball valve seats on the high pressure seat.

As the pressure is increased still further, which can be done by reason of the low-pressure seal formed by the resilient material, the seating surfaces 32 and 38 will be compressed. This compression can readily be accomplished by reason of the very small area of the seats 32 and 38 when they are first fabricated, as compared with the area of the ball valve 42 which is subjected to the high pressure. By reason of the small area, the seating surfaces are self-conforming to the ball valve 42 when subjected to a great pressure. As the seats 32 and 38 are further compressed, any irregularities which may exist as a result of the relatively low tolerances during the manufacturing process will quickly be compensated for by the elasticity of the material forming the sleeve 10 and a fluidtight seal will be formed. As the pressure increases even more, the seat surfaces 32 and 38 are compressed beyond the elastic limit of the sleeve material and the seating surfaces 32 and 38 are actually deformed to correspond precisely to the spherical tolerance of the ball valve 42 which, as previously mentioned, is 0.000,025 of an inch. The permanent deformation of the seats 32 and 38 will continue as the high pressure is increased until the total area of the seats 32 and 38 contacting the ball valve 42 is sufficiently great to withstand the total pressure exerted by the ball 42 on the seats. Of course it will be appreciated that if the resilient material is trapped by the metallic seats, it will also be under compression and will contribute to supporting the high pressure load on the ball valve. It should be appreciated that pressures sufficiently high to compress and deform high grade steel are being used and many synthetic resilient materials are compressible to at least some degree at these pressures. Of course if the amplified pressure of the resilient material exceeds that which the metallic seat can hold, a portion of the resilient material will extrude, thereby decreasing the volume and therefore the pressure of the resilient material. The support supplied by the resilient material will then be decreased and the metallic seats further deformed until a new equilibrium is reached due to a more perfect seat and increased area of the metallic seat. As previously mentioned, the crushing pressure which the ball valve 42 can withstand is in excess of 250,000 p.s.i.

In some applications, a single annular seating surface 32 may suffice, but if the pressure to be retained is great, the second seating surface 38 is preferred to withstand the great crushing force of the ball 42. The two seats are also preferred to provide an excellent means for securing the body of material 44 in place and for retaining the resilient material between two seals to prevent extrusion at high pressures.

As a practical matter, the last step of the construction process, that of placing the ball valve 42 under a high pressure, can be accomplished after the valve seat is installed for normal use. In this case, the first time the ball valve 42 is subjected to a high pressure, for example 10,000 p.s.i. or more, the force will immediately seat the ball valve against the resilient seating surface 44a to prevent the passage of high velocity liquid streams which might begin to erode the very fine seating surfaces 32 and 38. Then, the force will cut through the resilient material covering the seats 32 and 38 and deform the seats 32 and 38 to conform to the spherical perfection of the ball valve 42 and form a perfect seal therebetween. If the pressure is sufficiently great to exert a force in excess of the elastic limit of the sleeve material, the seats 32 and 38 will simultaneously be crushed and deformed until two perfect seating surfaces are formed.

The resilient material seating surface 44a has sufficient strength to hold lower pressures and will form a bubble-tight seal. As the pressure becomes greater, the ball valve 42 contacts the metallic seating surfaces 32 and 38. Before the pressure is great enough to deform the seating surfaces 32 and 38, the resilient rubber material is not extruded and the combination of the resilient seat 44a and the metallic seats 32 and 38 will hold the pressure. Whenever the pressure is sufficiently great to extrude the resilient rubber material, the metallic seats, with their small areas and self-conforming characteristic, are compressed to more perfectly mate with the ball valve 42 and form absolute seals which will prevent extrusion of the resilient rubber material. Further increases in the pressure being retained merely exert a force which exceeds the elastic limit of the steel and deforms the seating surfaces 32 and 38 to form even more perfect seats and more perfect seals to prevent both fluid leakage and extrusion of the body of resilient material 44.

From the above detailed description, it will be evident that a valve seat has been described which can readily be manufactured entirely by automated machinery, if desired. Further, the seat forms an absolute seal at high pressures and a vacuum-tight seal at low pressures. The resilient material 44 has a far greater resistance to abrasion than the stainless steel metallic sleeve 10. The spherical valve member 42 seats on the conical seating surface 44a of the resilient material first and, therefore, the greatest velocity occurs adjacent the seat at the instant the valve opens and closes. Therefore, the high fluid velocity contacts only the conical seating surface 44a at substantially the mid-point between the seating surfaces 32 and 38. When the spherical ball 42 contacts the seat 44a, the flow of liquid between the two members is stopped immediately so that the pressure builds up immediately behind the spherical ball 42 and almost instantaneously seats the ball on the metallic seat surfaces 32 and 38.

It will also be noted that due to the slight compressive deformation of the seats 32 and 38, the conical surface of the resilient material 44 extends slightly further into the fluid stream than the seats 32 and 38. Therefore, the extended resilient material 44 bears the brunt of the erosion force of the stream immediately adjacent the seating surfaces 32 and 38 and shields and protects the metallic seating surfaces. On every occasion, the ball valve 42 is first seated on the resilient material seating surface 44a which quickly stops the flow of fluid. Therefore, the seating surfaces 32 and 38 are never subjected to high velocity fluids caused by defective mating between the ball valve 42 and the annular seating surfaces 32 and 38. Before the pressure can build sufficiently to force the fluid through the valve, the ball valve 42 is clamped hard against the seating surfaces 32 and 38 by the force of the high pressure being retained.

The second body of resilient material 50 is provided to eliminate erosion due to fluid abrasion of the sleeve 10 downstream from the seating surfaces 32, 38 and 44a, the resilient synthetic rubber having a far greater resistance to abrasion than stainless steel. Provision of the body of resilient material also simplifies the molding operation used to bond the material to the counter bores because the excess material can be conveniently extruded by pressure from the top or second end 14 of the sleeve 10. The second resilient material body 50 also prevents marring of the ball valve 42 by high velocity contact with the stainless steel walls of the sleeve 10 and, in particular, the annular seating surface 38.

Further, a very economical, novel method for manufacturing the valve seat has been disclosed, which completely eliminates handlapping of the valve seat and a specific ball valve. Any ball valve can normally be randomly selected from a group of balls having the desired tolerances and be used with any seat manufactured as described.

It will also be appreciated that the valve seat described herein can, in its broadest scope, be used for a great number of applications. It will also be evident that the particular ball valve-type seat can be used in conventional check valves, spring-loaded check valves, and controlled valves where a stinger is used to unseat the ball valve, to name but a few.

Having thus described specific embodiments of my invention, it is to be understood that various changes can be made therein without departing from the spirit and scope of my invention as defined by the appended claims.

I claim:

1. A valve seat for a valve member having a spherically shaped surface comprising: a sleeve fabricated of metal and having first and second ends; a fluid orifice communicating between the first and second ends; a first counterbore of greater diameter than the fluid orifice extending from the second end to a point intermediate the ends of the sleeve and forming a first annular seating surface around the fluid orifice between the orifice and the first counterbore; a second counterbore of greater diameter than the first counterbore extending from the second end of the sleeve to a point spaced inwardly from said second end and forming a second annular seating surface between the first and second counterbores; the first and second annular seating surfaces being dimensioned and positioned to lie in an imaginary frusto-conical surface to simultaneously seat the valve member along substantially linear zones of contact; a body of resilient material filling the first counterbore between the first and second annular seating surfaces to form a resilient third annular seating surface lying in, and forming a portion of, said imaginary frusto-conical surface whereby said resilient seating surface tangentially contacts said valve member before said valve member contacts said first and second annular seating surfaces.

2. A valve seat as defined in claim 1 and further characterized by a second body of resilient material filling the second counterbore and bonded to the walls thereof, the second body of resilient material having a frusto-conical configuration and tapering from the second seating surface to the second end of the sleeve.

References Cited in the file of this patent

UNITED STATES PATENTS

| | | |
|---|---|---|
| 1,041,945 | Anderson | Oct. 22, 1912 |
| 1,101,643 | Lindelsee | June 30, 1914 |
| 2,034,829 | O'Malley | Mar. 24, 1936 |
| 2,293,068 | McLaughlin | Aug. 18, 1942 |
| 2,406,259 | Russell | Aug. 20, 1946 |
| 2,673,062 | Cornelius | Mar. 23, 1954 |
| 2,676,782 | Bostock | Apr. 27, 1954 |
| 2,784,737 | Kelly | Mar. 12, 1957 |
| 2,878,896 | Farrell | Mar. 24, 1959 |
| 2,904,877 | Edelen | Sept. 22, 1959 |
| 2,995,057 | Nenzell | Aug. 8, 1961 |

FOREIGN PATENTS

| | | |
|---|---|---|
| 192,758 | Austria | Dec. 15, 1956 |

OTHER REFERENCES

Bazley, abstract of application Serial Number 545,016, published Oct. 4, 1949.